June 23, 1953
F. S. WHALEY
2,642,962
FLUID PRESSURE BRAKE CONTROL APPARATUS
Filed Dec. 28, 1949
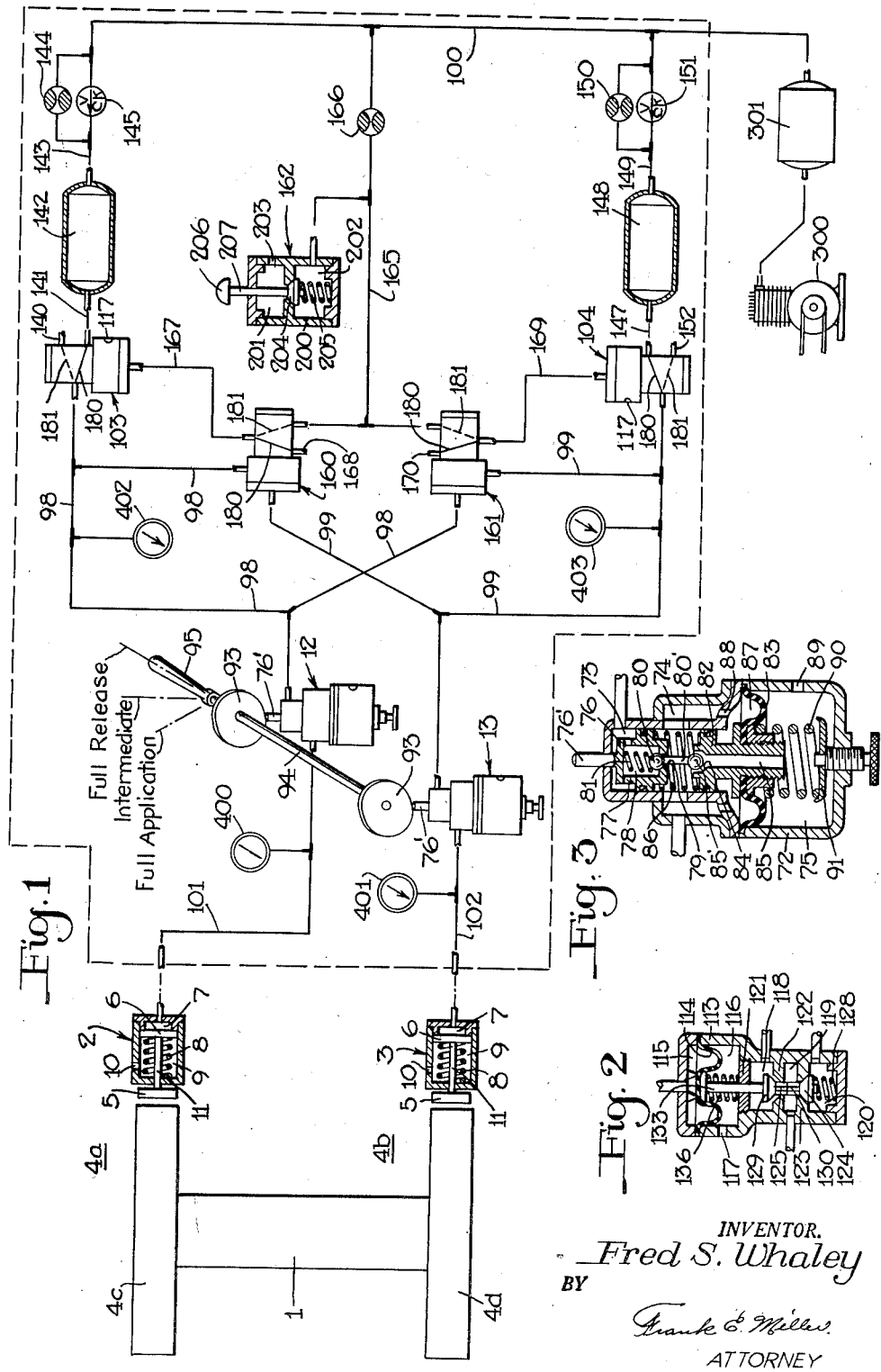
INVENTOR.
Fred S. Whaley
BY
Frank E. Miller
ATTORNEY Patented June 23, 1953

2,642,962

UNITED STATES PATENT OFFICE 2,642,962

FLUID PRESSURE BRAKE CONTROL APPARATUS

Fred S. Whaley, Greensburg, Pa., assignor to Westinghouse Air Brake Company, a corporation of Pennsylvania Application December 28, 1949, Serial No. 135,419

5 Claims. (Cl. 188—151)

This invention relates to fluid pressure brake control apparatus and more particularly to fluid pressure brake control apparatus for use in rotary drilling equipment.

The principal object of the invention is the provision of improved fluid pressure brake control apparatus for braking such as the draw works hoisting drum on rotary drilling equipment.

Other objects and advantages will become apparent from the following more detailed description of the invention.

In the accompanying drawing, Fig. 1 is a schematic representation, partly in outline and partly in section, of a fluid pressure brake control apparatus embodying the invention associated with a draw works cable drum; Fig. 2 is a schematic representation in cross-section of a relay valve device, a plurality of which are employed in the apparatus shown in Fig. 1; and Fig. 3 is a schematic representation in cross-section of a self-lapping valve device, several of which are employed in the control apparatus shown in Fig. 1.

Description

As shown in the drawing, numeral 1 indicates a rotary element such as a cable drum on which may be wound hoisting cable (not shown) such as is employed on rotary oil well rigs for supporting drill pipe etc. Through turning of the drum in one direction or the other, the cable will wind or unwind on the drum for raising and lowering drill pipe, tools etc. in and out of the hole being drilled.

To control the rate of turning movement of the drum 1 and thereby control the rate of unwinding of the cable wound thereon, for example, fluid pressure brakes 4a and 4b are provided at opposite ends of the drum. The brakes 4a and 4b comprise cylindrical shaped elements 4c and 4d which are attached to the drum 1 at its opposite ends, respectively. The brakes 4a and 4b further comprise fluid pressure brake cylinder devices 2 and 3 operable to effect movement of friction shoes 5 into frictional engagement with cylindrical elements 4c and 4d, respectively, thereby to effect a braking of the drum 1.

The brake cylinder devices 2 and 3 are alike, and schematically each may comprise a casing containing a brake cylinder piston 6 slidably disposed therein which is subject opposingly to pressure of fluid in a brake cylinder pressure chamber 7 at one side and to force of the usual piston return spring 8 disposed in a spring chamber 9 at its opposite side. The spring chamber 9 is constantly open to atmosphere by way of a port 10. The piston 6 is operatively connected to the respective brake shoe 5 by means of a piston rod 11 attached to the piston for reciprocable movement therewith. In each of the brake cylinder devices 2 and 3, in response to supply of fluid under pressure to the pressure chamber 7, the piston 6 will oppose action of the return spring 8 and move in the direction of the chamber 9 for engaging the brake shoe 5 with the member 4c or 4d. The shoe 5 will exert a force against the member 4c, 4d according to the degree of pressure in the pressure chamber 7. The force exerted by the shoe 5 against the member 4c, 4d determines the degree of restraint imposed to oppose rotation of the drum 1, which degree of restraint will hereinafter be referred to as the degree of brake application. The degree of brake application may be increased or decreased by regulation of the pressure of fluid in the chamber 7. Upon substantial complete release of fluid under pressure from the brake cylinder pressure chamber 7, the return spring 8 will move the piston 6 back to a rest position, in which it is shown in the drawing, carrying the respective brake shoe 5 to a retracted position out of engagement with the member 4c or 4d, which action will hereinafter be referred to as release of the brake application by the respective brake cylinder device.

The apparatus for controlling operation of the brake cylinder devices 2 and 3 is enclosed in the drawing by a dash line to indicate that such apparatus may be encased in such as a roving control stand which may be located some distance away from the brake cylinder devices 2 and 3, at the hoisting cable drum 1, to allow an operator, such as a driller on a rotary oil drilling rig, to select a point of vantage from which he may coordinate operation of the cable drum with operations being performed by a crew of men located at different stations, such as on the floor of a derrick and in a derrickman's perch situated a considerable distance above the derrick floor.

For effecting variations in pressure of fluid in the pressure chambers 7 in the brake cylinder devices 2 and 3, self-lapping valve devices 12 and 13, respectively, are provided. Referring to Fig. 3, each of the self-lapping valve devices 12 and 13 may comprise a casing 72 having a fluid pressure supply chamber 73, a delivery chamber 74, and an exhaust chamber 75 therein. A supply valve seat element 76, attached to an operating stem 76' is adapted for reciprocable movement within the casing 72. Element 76 is open intermediate its ends to the supply chamber 73 which is connected by way of ports 77 to a central cavity 78 provided within said element, and at its lower end, as viewed in the drawing, said element is open to the delivery chamber 74 which is connected to cavity 78 by way of a supply valve seat 79. A supply valve 80 in the form of a ball may be disposed within cavity 78 for controlling communication between the supply chamber 73 and the delivery chamber 74. A bias spring 81 is disposed in the cavity 78 arranged to urge the valve 80 toward a normally closed position on seat 79. An exhaust valve seat element 82, secured for reciprocable movement with deflection of a diaphragm 83, is open at one end to the delivery chamber 74 and has an exhaust valve seat 84 formed therein. Valve seat element 82 extends through the diaphragm 83 with its opposite end disposed in the exhaust chamber 75 and has a central opening 85 extending from end to end and through the valve seat 84 at the one end. An exhaust valve 85', connected to the supply valve 80 by a pin 80', and also in the form of a ball, is disposed in delivery chamber 74 to cooperate with the seat 84 in element 82 for controlling communication via opening 85 between said delivery chamber and the exhaust chamber 75. A bias spring 86, disposed in the delivery chamber 74, is interposed between seat elements 76, 82 for biasing the seat element 76 in the direction of chamber 73. The diaphragm 83 is subject on one side to pressure of fluid in a diaphragm chamber 87, which pressure of fluid is that of the delivery chamber 74, the two chambers being connected one with the other by way of ports 88. The opposite side of the diaphragm 83 is exposed to atmosphere by way of a port 89 in the casing. A compression control spring 90 is disposed in the exhaust chamber 75, interposed between the diaphragm and an adjustable spring seat element 91, for determining the degree of deflection of said diaphragm for any given pressure condition in the delivery chamber 74. The adjustable spring seat 91 is provided to allow for changing precompression of the control spring 90.

When stem 76' is moved inwardly of the casing 72 a certain distance, the attached seat element 76 is moved downwardly, as viewed in the drawing, while the supply valve seat 79 formed in the end of element 76 is moved away from the supply valve 80. At this time, supply valve 80 will remain stationary due to seating engagement of the attached exhaust valve 85' on seat 84 of element 82. When the supply valve seat 79 moves away from the supply valve 80, supply chamber 73 is opened to delivery chamber 74 by way of ports 77, cavity 78 and seat 79. Fluid under pressure from a source of supply which may be connected to supply chamber 73 will then flow into the delivery chamber 74 where the pressure of fluid will thus be caused to increase. Pressure of fluid in diaphragm chamber 87 open to chamber 74, being greater than the atmospheric pressure in chamber 75, will deflect diaphragm 83 against action of spring 90 in the direction of the last mentioned chamber. Deflection of diaphragm 83 will carry the exhaust valve seat element 82 with it. Bias spring 81 will cause the supply valve 80 and exhaust valve 85' to follow movement of element 82, while said exhaust valve remains seated on seat 84 in the end of said element, until said supply valve seats on seat 79 in element 76. Upon seating of the supply valve 80, the supply chamber 73 is closed to the delivery chamber 74 and further increase in pressure in the latter chamber thereby will be prevented. In absence of further increase in delivery pressure in the diaphragm chamber 87, the pressure force on one side of diaphragm 83 will balance with the spring force on its opposite side and further deflection of said diaphragm will cease. The supply valve 80 and the exhaust valve 85' will remain seated. If, at this time, stem 76' were moved inwardly a greater amount, element 76 would again be moved downwardly to unseat from the supply valve 80, and the above described action would repeat, and a corresponding increase in pressure of fluid would be secured in the delivery chamber 74. The pressure of fluid thus obtained in the delivery chamber 74 will vary in substantial proportion to the degree of inward movement of the operating stem 76'. The minimum pressure which will be held in the delivery chamber 74 will depend on the degree of precompression of the control spring 90, which precompression may be changed by adjustment of the spring seat element 91.

If, subsequently, the operating stem 76' is allowed to be moved outwardly of casing 72 by action of spring 86 to a more extended position, the supply valve 80 and attached exhaust valve 85' will be carried with it. The exhaust valve 85' is thus unseated from seat 84 in element 82, and the delivery chamber 74 is thereby opened by way of opening 85 in said element to the exhaust chamber 75. Delivery pressure in chamber 74 is thus caused to reduce, and such reduction, reflected in the diaphragm chamber 87, allows the control spring 90 to deflect the diaphragm 83 upwardly. Upward deflection of the diaphragm 83 carries the element 82 into engagement with the exhaust valve 85'. The delivery chamber 74 is thus closed off from the exhaust chamber 75 and further reduction in delivery pressure thereby will be prevented. Under such condition, the diaphragm 83 ceases further deflection, and both the supply valve 80 and the exhaust valve 85' remain seated. A reduced delivery pressure, determined by position of the operating stem 76', is thus secured.

Summarizing action of the self-lapping valve devices 12 and 13 it will be seen that with the proper adjustment of the spring 90, and with fluid at adequate pressure in chamber 73, the pressure of fluid in the delivery chamber 74 is determined by position of element 76 as adjusted through positioning of stem 76'. By effecting displacement of stem 76' inwardly of the casing 72, pressure of fluid in delivery chamber 74 will be increased in amount proportional to the degree of said displacement. Conversely, as outward movement of stem 76' is effected, the pressure of fluid in the delivery chamber 74 will be decreased in amount proportional to degree of said outward movement. In both valve devices 12 and 13 a certain outermost limit position of the stems 76' is defined by rest positions of a respective cam 93. The outermost limit position of stem 76' in devices 12 and 13 corresponds to a certain minimum pressure of fluid in delivery chamber 74. Maximum inward displacement of stem 76' calls for maximum delivery pressure. Still further, both the valve device 12, and the valve device 13 are self-maintaining, that is, any tendency for increase or decrease in pressure of fluid in delivery chamber 74 out of accord with position of stem 76' is automatically compensated for to prevent such occurrence in manner as aforedescribed.

The two cams 93 are identical and are secured for turning movement one with the other by a shaft 94 to which is attached an operator's handle 95 which provides for turning the shaft and cams for simultaneous equal adjustment in the position of the respective stems 76' to cause simultaneous equal regulation in pressure of fluid in the respective chambers 74 and thereby in pressure chambers 7 of the brake cylinder devices 2, 3 to which the chambers are connected by pipes 101 and 102, respectively. The cams 93 are so shaped that as the handle 95 is rocked in a counter-clockwise direction, as viewed in the drawing, the stems 76' will be displaced inwardly distances proportional to the degree of rocking movement of said handle. Conversely, as the handle 95 is rocked in the opposite direction the stems 76' will be allowed to move outwardly of the devices 12 and 13 in amount proportional to the degree of rocking movement of the handle.

The supply chambers 73 in the self-lapping valve devices 12 and 13 are connected to pipes 98 and 99, respectively, which when connected to a fluid pressure supply pipe 100 act to convey fluid under pressure, say one hundred pounds for example, to the respective supply chambers 73, so that devices 12 and 13 may be operated to effect operation and control of the brake cylinder devices 2 and 3 through the medium of the brake cylinder pipes 101 and 102 connected, respectively, to the brake cylinder pressure chambers 7 in the brake cylinder devices 2 and 3.

With the pipes 98 and 99 both charged with fluid at a certain pressure, such as one hundred pounds for chosen example, when the operator's handle 95 is moved from the position in which it is shown in the drawing and titled "Full Release" to a position indicated in the drawing by a dot-and-dash line titled "Intermediate," the pressure of fluid in the brake cylinder pipes 101 and 102 and connected brake cylinder pressure chambers 7 simultaneously will be increased from substantially atmospheric pressure to some pressure such as fifty pounds. A detent (not shown) may be provided to locate such "Intermediate" position. When the handle 95 is moved between the "Intermediate" position and a position titled "Full Application," the pressure of fluid in the brake cylinder pipes 101 and 102 and connected brake cylinder pressure chambers 7 will be varied simultaneously between fifty and one-hundred pounds, respectively, for example.

For reasons which hereinafter will become obvious, relay valve devices 103 and 104 are provided which control communicaton between the pipes 98, 99, respectively, and the supply pipe 100.

Referring to Fig. 2, the relay valve devices 103 and 104 may each comprise a casing 113 having a diaphragm 114 disposed therein and subject to pressure of fluid in a diaphragm chamber 115 on one side and to pressure of fluid in a chamber 116 on its opposite side, which latter chamber is open to the exterior of the casing via a port 117. Also formed in the casing are chambers 118, 119 and 120; chamber 118 being separated from chamber 116 by a partition 121 and from chamber 119 by a partition 122. A partition 123 separates chambers 119, 120. A valve 124 is disposed in chamber 120 for controlling communication between said chamber and the chamber 119. Valve 124 may be secured to a fluted stem 130 slidably mounted in a suitable bore extending through the partition 123, a seat being formed in one end of said bore to accommodate said valve. A bias spring 128 is disposed in chamber 120, arranged to urge the valve 124 in the direction of its seat. A valve 129, similar to valve 124, is disposed in chamber 118 for controlling communication between said chamber and the chamber 119. For slidably guiding valve 129, a fluted stem 125 is provided which is slidably disposed in a suitable bore opening through partition 122. A valve seat is formed in partition 122 for accommodating the valve 129. Stems 125, 130 project into and meet in the chamber 119 in such a manner that action of bias spring 128 on valve 124, in urging same in the direction of its seat, at the same time, through said stems, urges valve 129 in a direction away from its respective seat. If valve 129 is seated, valve 124, consequently, will be unseated. Valve 129 is operably connected to the diaphragm 114 by means of a rod or stem 133 extending therebetween through a bore in partition 121 in which said rod is slidably disposed. A control spring 136 is provided in chamber 116, arranged to oppose deflection of the diaphragm 114 in the direction of chamber 118 as caused by pressure of fluid in chamber 115 for determining the degree of said pressure necessary for effecting operation of valves 124, 129.

In operation, when their respective chambers 116 are vented to atmosphere the relay valve devices 103 and 104 will respond to a certain pressure of fluid in the diaphragm chamber 115 to close valve 129 and open valve 124 to connect the chamber 119 to chamber 120. Upon a subsequent certain reduction in pressure of fluid in diaphragm chamber 115, relay valve devices 103, 104 will respond to close their valve 124 and to open their valve 129 to connect chamber 118 to chamber 119.

In the relay valve device 103; its chamber 120 is connected to a pipe 140 which may either be open to the atmosphere or may be blanked off as will hereinafter become apparent from subsequent description; its chamber 119 is connected to the pipe 98; and its chamber 118 is connected to the supply pipe 100 by way of a pipe 141, a volume chamber 142, a pipe 143, and a choke 144 and check valve 145 arranged in parallel relationship.

In the relay valve device 104; the chamber 118 is connected to the supply pipe 100 by way of a pipe 147, a volume chamber 148, a pipe 149, and a choke 150 and check valve 151 arranged in parallel relationship; its chamber 119 is connected to the pipe 99; and its chamber 120 is connected to a pipe 152 which may either be open to the atmosphere or may be blanked, that is, closed.

In both of the relay valve devices 103 and 104, the chamber 116 at one side of the diaphragm 114 is open to atmosphere via port 117.

For controlling operation of the relay valve devices 103 and 104, relay valve devices 160 and 161 are provided, respectively, as well as a push button type of valve device 162.

The relay valve devices 160 and 161 may be substantially alike the relay valve devices 103 and 104 previously described, and as shown in Fig. 2.

In the relay valve device 160; its chamber 120 is connected to the corresponding chamber 120 in the relay valve device 161 by way of a pipe 165 which has a connection with the supply pipe 100 by way of a choke 166; its chamber 119 is connected to the control chamber 115 in the relay valve device 103 by way of a pipe 167; its chamber 118 is connected to atmosphere by way of pipe 168; its chamber 116 is connected, via its port 117, to the pipe 98; and its control chamber 115 is connected to a branch of the pipe 99.

In the relay valve device 161; its chamber 119 is connected to the control chamber 115 in the relay valve device 104 by way of a pipe 169; its chamber 118 is connected to atmosphere by way of a pipe 170; its chamber 116 is connected to a branch of the pipe 99, and its control chamber 115 is connected to a branch of the pipe 98.

In the relay valve devices 103, 104, 160 and 161, when their respective valves 124 are seated and their respective valves 129 unseated, the communication between the chambers 119 and 118 which is established by way of the unseated valve 129 in each valve device hereinafter will be referred to as communication 180, indicated symbolically in Fig. 1 by solid lines bearing the reference numeral 180; similarly, a dash line bearing reference numeral 181 in Fig. 1 will hereinafter represent the communication 181 which is established in each of the relay valve devices 103, 104, 160, 161 between chamber 119 and chamber 120 which is established when the valve 129 is seated and the valve 124 is unseated.

The relay valve devices 160 and 161 will operate similarly to the relay valve devices 103 and 104 with the exception that when their respective chambers 116 are charged with fluid under pressure, the effect of fluid under pressure in their respective control chambers 115 is nullified so that their respective communications 180 remain established until their respective chambers 116 are vented to atmosphere.

The push button valve device 162, schematically, may comprise a casing 200 having an exhaust chamber 201 and an inlet chamber 202 formed therein. The exhaust chamber 201 is constantly open to atmosphere by way of a port 203 in the casing, while the inlet chamber 202 is connected to a branch of the pipe 165. A valve 204 controls a communication between the inlet and exhaust chambers 201, 202. The valve 204 when in a closed position in which it is shown in the drawing, closes the chamber 202 from the chamber 201, and when in an open position, opens the chamber 202 to the chamber 201, hence to the atmosphere. A compression spring 205 disposed in the chamber 202 is arranged to bias the valve 204 to its closed position. A push button 206 is attached by means of a stem 207 to the valve 204 for actuating same to its open position by manual operation. Upon release of force exerted manually on the push button 206, the spring 205 will return the valve 204 to its closed position.

To furnish fluid under pressure for the system supply pipe 100 a compressor 300 is provided which may be driven through a belt by a motor (not shown) to supply fluid under pressure to a reservoir 301 with which the pipe 100 has a connection.

Pressure gauges 400, 401, 402 and 403 are connected to pipes 101, 102, 98 and 99, respectively, to indicate the pressure of fluid in these pipes to an operator.

*Operation*

Assume that the reservoir 301 is charged with fluid under pressure, that the pipes 98 and 99 are charged with fluid under pressure and that therefore both chambers 116 and 115 in both relay valve devices 160 and 161 are charged with fluid under pressure from the pipes 98 and 99 so that the respective communication 180 in each of these relay valve devices will be established, as will be appreciated from previous description. With the respective communication 180 established in each of the relay valve devices 160 and 161, the respective control chamber 115 in each of the relay valve devices 103 and 104 will be vented to atmosphere by way of pipes 167, 168 and 169, 170, respectively. With their respective control chambers 115 thus vented, the relay valve devices 103 and 104 will each have their respective communication 180 established, connecting pipes 98 and 99 to pipes 141 and 147, respectively, thence to the system supply pipe 100 by way of volume chambers 142, 148, pipes 143, 149, and check valves 145, 151 or chokes 144, 150. The pipe 165 will be charged with fluid under pressure from the pipe 100 by way of choke 166. The push button 206 of valve device 162 will be fully extended so that its chamber 202 connected to pipe 165 will be closed to its chamber 201 which is open to atmosphere. Assume that the operator's handle 95 is in its "Full Release" position, with the respective stems 76' of the valve devices 12 and 13 fully extended so that the brake cylinder pipes 101 and 102 both will be vented with the brakes 4a and 4b fully released as will be appreciated from previous description.

Assume now that the operator desires to apply the brakes 4a and 4b. He will move the operator's handle 95 out of its "Full Release" position toward or to its "Intermediate" position to effect simultaneous supply of fluid from pipes 98 and 99 to the brake cylinder pressure chambers 7 by way of pipes 101 and 102 to cause engagement of brake shoes 5 with elements 4c and 4d, applying a braking force in restraint of turning movement of the drum 1 according to the degree of pressure thus applied to the brake cylinder pressure chambers 7.

According to a feature of the invention, should a break or severe leak occur in one of the brake cylinder pipes 101, 102, brake cylinder pipe 101, for example, while the brakes 4a and 4b are applied, fluid under pressure in the pressure chamber 7 in brake cylinder device 2 will escape through the break in the brake cylinder pipe, releasing the brake 4a, while fluid under pressure also will escape suddenly from the chamber 74 in the valve device 12 by way of the break in pipe 101. With the brake cylinder pipe 102 intact, the brake 4b will remain applied. In the valve device 12, when fluid under pressure escapes from the chamber 74, pressure in the chamber 87 will become reduced suddenly as fluid leaves through ports 88 and the chamber 74. In response to sudden venting of the chamber 87, the diaphragm 83 will respond to move seat element 82 in the direction of chamber 74, carrying the seated exhaust valve 85' with it and thereby causing unseating of the supply valve 80, whereupon fluid under pressure from the pipe 98 will flow rapidly by way of the chamber 73, ports 77, chamber 78, and the unseated supply valve in an effort to make up for the loss of fluid in the chamber 74 which escaped by way of the broken pipe 101. Such sudden flow of fluid under pressure from the pipe 98 will tend to reduce the pressure of fluid in the pipe 100 by way of the communication 180 in relay valve device 103, pipe 141, chamber 142, pipe 143 and check valve 145. The volume chamber 142 will store sufficient fluid under pressure however to supply the surge of fluid under pressure to the valve device 12, thereby reducing the tendency for the pressure in the pipe 100 to be reduced by such surge. The choke 150 and check valve 151 act to prevent any sudden reduction in pressure in pipe 100 from reducing the pressure of fluid in the brake cylinder device 3 by way of the pipe 102, device 13, pipe 99, device 104, pipe 147, chamber 148 and pipe 149. Since the pipe 99 remains charged with fluid under pressure and is not influenced by a break in the pipe 101, the control chamber 115 in the relay valve device 160 will remain charged while the pressure in the chamber 116 reduces substantially with the surge of fluid under pressure flowing from pipe 98 to the break in pipe 101. The relay valve device 160 with its control chamber 115 charged will therefore respond to such reduction in its chamber 116 to disestablish its communication 180 and to establish its communication 181, thereby disconnecting the pipe 167 from atmosphere via pipe 168 and connecting said pipe 167 to the pipe 165, whereupon fluid under pressure will flow from the supply pipe 100, via the choke 166, pipe 165, said communication 181, and said pipe 167 to the control chamber 115 in the relay valve device 103. The relay valve device 103 will then respond to disestablish its communication 180 and to establish its communication 181, thereby disconnecting the pipe 98 from the pipe 141, hence from the supply pipe 100 to prevent further loss of fluid under pressure from the system by way of the valve device 12 and the break in the pipe 101 as assumed. The communication 181 in the relay valve device 103 connects the pipe 98 to the pipe 140 which may be either vented or plugged, since the essential function of the device 103 is to disestablish connection between the broken pipe 101 and the supply pipe 100 in the event that a break occurs.

With the pipe 98, hence the ruptured brake cylinder pipe 101, thus isolated from the supply pipe 100, the source of fluid under pressure remains intact so that fluid at full reservoir pressure exists in the pipe 99, available for supply to the pressure chamber 7 in the brake cylinder device 3. The operator's handle 95 may be moved beyond "Intermediate" position toward "Full Application" position to increase the pressure of fluid in the pressure chamber 7 in the brake cylinder device 3 to effect increased application of the brake 3 to compensate for the loss in braking of the drum 1 when the brake 4a is rendered ineffective by loss of pressure in the brake cylinder pipe 101 assumed to have been ruptured. The volume chamber 148 will act as an immediate source of fluid under pressure for supply to the brake cylinder device 3 so that such may be accomplished effectively and readily.

Upon repair of the ruptured brake cylinder pipe 101, communication between the pipe 98 and the supply pipe 100 may be reestablished to reinstate the idle brake 4a by manually depressing the push button 206 of the valve device 162. Upon depression of the push button 206 of valve device 162, the valve 204 in device 162 will be unseated to vent the pipe 165, thereby allowing for release of fluid under pressure from the control chamber 115 in the relay valve device 103 by way of the pipe 167, the communication 181 in the relay valve device 160 and said pipe 165. The choke 166 prevents excessive release of fluid under pressure from the supply pipe 100 when the pipe 165 is vented via the device 162. Upon release of fluid under pressure from its control chamber 115, the relay valve device 103 will respond to reestablish its communication 180 which again connects the pipe 98 to the pipe 141 and therefore to the supply pipe 100 by way of the volume chamber 142, the pipe 143, the choke 144 and check valve 145. The pipe 98 will again become pressurized with fluid at full reservoir pressure from the pipe 100 which condition will be indicated by the pressure gauge 402, the chamber 116 in the relay valve device 160 will become pressurized with fluid from the pipe 98 and respond to disconnect pipe 167 from the pipe 165 and to connect said pipe 167 to pipe 168 to atmosphere, whereupon the operator may release the push button 206 to allow the valve 204 in the valve device 162 to close, thereby preventing further release of fluid under pressure from the pipe 100 via choke 166 and pipe 165. With the operator's handle 95 in a position between "Intermediate" and "Full Application" position as assumed, when the pipe 98 is again connected to the pipe 100, fluid under pressure from the pipe 98 will flow by way of the unseated supply valve 89 in the valve device 12 to the pressure chamber 7 in the brake cylinder device 2 by way of the repaired brake cylinder pipe 101. The gauge 400 in pipe 101 will indicate to the operator whether or not the pressure of fluid thus supplied to the device 2 is maintained and therefore whether or not the repair has been successful.

To reduce the degree of or to release the application of both brakes 4a and 4b, simultaneously, the operator's handle 95 may be moved back toward or to "Full Release" position to reduce the pressure of fluid in the respective chambers 7 in brake cylinder devices 2 and 3, as will be appreciated from previous description. Application and release of both brakes 4a and 4b will again be effected in unison through adjustment in position of the operator's lever 95 to and between the "Full Release" and "Intermediate" positions.

It will be appreciated that should the brake cylinder pipe 102 rupture or develop a severe leak, in fashion similar to that aforedescribed in connection with pipe 101, the apparatus will function to disestablish communication between the pipe 99, thereby the ruptured brake cylinder pipe 102, and the supply pipe 100 by operation of the relay valve device 104 to prevent loss of working fluid from the system while maintaining the brake 4a applicable or applied while the brake 4b is rendered ineffective by the rupture in brake cylinder pipe 102.

Summary

It will now be seen that I have provided fluid pressure control apparatus for controlling operation of a pair of brake cylinders for braking such as a hoisting drum. The control apparatus may be adjusted manually to effect regulation of pressure of fluid from a source thereof to and its release from the brake cylinder devices by way of respective brake cylinder pipes which operatively connect the control apparatus with such brake cylinder devices. During normal operation of the brake cylinders in unison, the pressure may be varied therein below a certain limit value to obtain adequate braking of the drum. In event that one or the other of the brake cylinder devices should be rendered ineffective by development of an excessive leak in a respective brake cylinder pipe, through rupture or the like, the control apparatus will respond automatically to isolate the ruptured brake cylinder pipe from the rest of the system. Adequate braking of the drum may then be obtained through manual adjustment of the control apparatus to effect supply of fluid at pressures in excess of the above-mentioned limit value to the brake cylinder device served by the brake cylinder pipe remaining intact, to obtain adequate braking of the drum. Isolation of the ruptured brake cylinder pipe may be terminated upon repair of the pipe by manual depression of a push button.

Having now described my invention, what I claim as new and desire to secure by Letters Patent, is:

1. The combination with a source of fluid under pressure and a fluid pressure supply pipe connected thereto, of a first brake cylinder device, a second brake cylinder device, a first brake cylinder pipe connected to said first brake cylinder device, a second brake cylinder pipe connected to said second brake cylinder device, a first conduit, a second conduit, an operator's valve device operable manually to simultaneously establish respective individual communications between said first brake cylinder pipe and first conduit and between said second brake cylinder pipe and said second conduit, first relay valve means responsive to release of fluid under pressure from a first control chamber to establish a first communication connecting said first conduit to said supply pipe and responsive to supply of fluid under pressure to said first control chamber to disestablish said first communication, second relay valve means responsive to release of fluid under pressure from a second control chamber to establish a second communication connecting said second conduit to said supply pipe and responsive to supply of fluid under pressure to said second control chamber to disestablish said second communication, a third conduit having a connection with said supply pipe, third relay valve means responsive to a reduction in pressure in said first conduit below that in said second conduit to establish a third supply communication connecting said first control chamber to said third conduit and responsive to equalization of pressures in the first and second conduits to establish a third exhaust communication connecting said first control chamber to atmosphere, and fourth relay valve means responsive to a reduction in pressure in said second conduit below that in said first conduit to establish a fourth supply communication connecting said second control chamber to said third conduit and responsive to equalization in pressures in the first and second conduits to establish a fourth exhaust communication connecting said second control chamber to atmosphere.

2. The combination as set forth in claim 1, including a choke inserted in the connection of said third conduit with said supply pipe and other valve means operable manually to vent said third conduit to atmosphere.

3. The combination as set forth in claim 1, including respective flow modifying means interposed between the first and second relay valve means and said supply pipe to allow for facile flow of fluid from said supply pipe to the first and second conduits and to restrict flow of fluid in the reverse direction.

4. The combination as set forth in claim 3, including respective volume chambers interposed between said flow modifying means and the first and second relay valve means.

5. Apparatus for controlling admittance and release of fluid under pressure to and from a pair of brake cylinder pipes, said apparatus comprising a source of fluid under pressure, two fluid pressure supply pipes, two operator's control valve devices controlling connection of said brake cylinder pipes alternatively with said supply pipes, respectively, or with the atmosphere, protection means controlling opening and closing of two supply communications connecting said supply pipes, respectively, with said source, said protection means having a normal position opening both of said supply communications and having two emergency positions closing one or the other of said supply communications, respectively, said protection means being responsive while in said normal position to a reduction in pressure of fluid in one of said supply pipes relative to pressure of fluid in the other of said supply pipes to assume one or the other of said emergency positions to close the respective supply communication connected to the supply pipe at reduced pressure, said protection means also being responsive to establishment of a reset pressure condition to return same to its normal position, and reset valve means connected to said protection means to establish said reset pressure condition.

FRED S. WHALEY.

References Cited in the file of this patent

UNITED STATES PATENTS

| Number | Name | Date |
|---|---|---|
| 2,464,469 | Tremolada | Mar. 15, 1949 |
| 2,544,997 | Keim et al. | Mar. 13, 1951 |